ELECTROLUMINESCENT DEVICE
Filed April 29, 1958
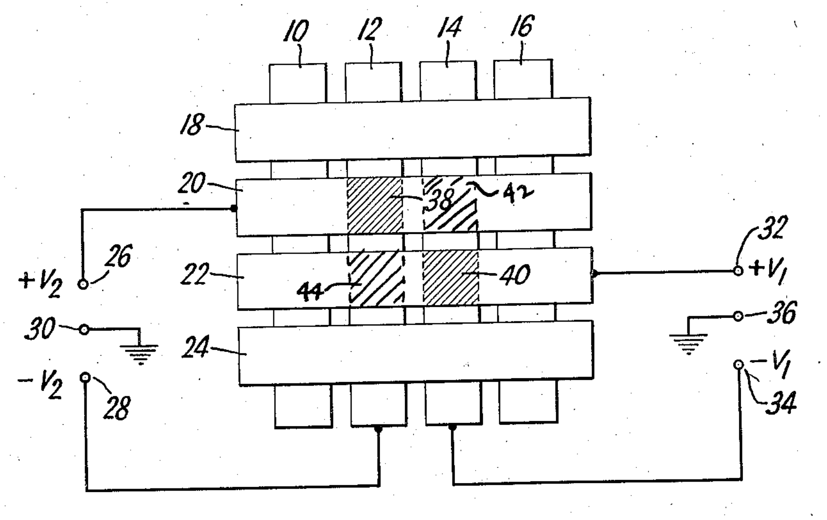
INVENTOR
DONALD C. LIVINGSTON
BY [signature]
ATTORNEY United States Patent Office
2,881,360
Patented Apr. 7, 1959

2,881,360

ELECTROLUMINESCENT DEVICE

Donald C. Livingston, Bayside, N.Y., assignor to Sylvania Electric Products Inc., a corporation of Delaware Application April 29, 1958, Serial No. 731,825
4 Claims. (Cl. 315—169)

My invention is directed toward electroluminescent devices.

Certain types of phosphors, when under the influence of an externally applied electric field, will luminesce, the intensity of the emitted light being some function of the intensity of this field. Consequently, films or layers formed from such phosphors can be used as transducers for converting electrical energy to light energy. These layers, for example, can be formed by dispersing phosphor particles in dielectric media or can be formed from one or more phosphor crystals without a dielectric. Devices utilizing such layers are known as electroluminescent devices.

I have invented an electroluminescent device responsive to two incoming alternating signals, which either have slightly different frequencies or have the same frequencies but exhibit a phase shift relative to each other, to produce a light signal proportional to the frequency difference or phase difference between these two signals.

In accordance with the principles of my invention, I provide an electroluminescent layer. A first array of parallel, separated, electrical conductors extending in a first direction is applied to one side of this layer, and a second array of parallel, separated, electrical conductors extending in a second and different direction is applied to the other side of this layer. The conductors in at least one of the arrays are transparent. Each portion of the layer immediately adjacent the point at which any first array conductor crosses over any second array conductor is therefore electrically coupled between these two conductors. Each of these portions of the layer together with the associated first and second array conductors constitutes an electroluminescent cell.

A first alternating signal is applied between a first conductor in the first array and a first conductor in the second array, thus causing the corresponding cell, the first cell, to luminesce correspondingly. Similarly, a second alternating signal is applied between a second conductor on the first array and a second conductor on the second array, thus causing the corresponding cell, the second cell, to luminesce accordingly.

The first conductor in the first array together with the second conductor in the second array and the associated portion of the electroluminescent layer form a third cell. The second conductor in the first array together with the first conductor in the second array and the associated portion of the electroluminescent layer form a fourth cell.

When the two signals differ in frequency by a small amount, the light emitted from the third and fourth cells will pulsate at the difference frequency. On the other hand, when the two signals have the same frequency but exhibit a phase shift relative to each other, the intensity of the light emitted from the third and fourth cells will be dependent upon the magnitude of the phase shift. More particularly, the intensity is a maximum when the two signals are in phase and decreases as the phase shift between the signals increases.

An illustrative embodiment of my invention will now be described with reference to the accompanying figure.

Referring now to the figure, there is provided a first array of coplanar, parallel, separated, transparent, electrical conductors extending in a first direction, in this example, vertical conductors 10, 12, 14, and 16. Similarly, there is provided a second array of coplanar, parallel, separated, electrical conductors extending in a second direction, in this example, horizontal conductors 18, 20, 22, and 24. An electroluminescent layer is interposed and electrically connected between the first and second arrays.

Terminals 30 and 36 are grounded. Terminals 26 and 32 are respectively connected to horizontal conductors 20 and 22. Terminals 28 and 34 are respectively connected to vertical conductors 12 and 14.

A first push-pull signal, balanced with respect to ground, is applied between terminals 26 and 28, causing cell 38 to luminesce accordingly. Similarly, a second push-pull signal, balanced with respect to ground, is applied between terminals 32 and 34, and cell 40 luminesces accordingly.

When the first and second signals have like frequency and phase, cells 38, 40, 42, and 44 will all luminesce in the same manner. However, when the two signals differ in frequency by a small amount as, for example, 0.1 cycle/second, the light emitted from cells 38 and 40 will not change with time, but the light emitted from cells 42 and 44 will pulsate at the difference frequency. By counting the number of light pulsations occurring in a given time interval, the difference frequency can be computed directly.

When the first and second signals have the same frequency, but differ in phase, for example 45°, it will be found that cells 38 and 40 will be brighter than cells 42 and 44. By shifting the phase of one applied signal relative to the other, as for example, by using a calibrated phase shifter, the brightness of cells 42 and 44 can be increased to equal that of cells 38 and 40. The original phase difference can then be found by reading the phase shifter indication.

It will be apparent that individual signals rather than push-pull signals can be employed by slightly modifying the arrangement shown in the figure. More particularly, in such a modification, terminals 30 and 36 are not used. Then, if a first individual signal is applied between terminals 26 and 28, while a second signal is applied between terminals 34 and 32, the phase or frequency difference between these signals can be computed as before.

While I have shown and pointed out my invention as applied above, it will be apparent to those skilled in the art that many modifications can be made within the scope and sphere of my invention.

What is claimed is:

1. An electroluminescent device comprising an electroluminescent layer; a first array of parallel, separated, electrical conductors extending in a first direction in contact with one surface of said layer; a second array of parallel, separated, electrical conductors extending in a second and different direction in contact with the other surface of said layer, the conductors in at least one of said arrays being transparent; means to apply a first alternating signal between a first conductor in said first array and a first conductor in said second array; and means to apply a second alternating signal between a second conductor in said first array and a second conductor in said second array.

2. An electroluminescent device comprising an electroluminescent layer; a first array of parallel, separated, electrical conductors extending in a first direction in contact with one surface of said layer; a second array of parallel, separated, electrical conductors extending in a second and different direction in contact with the other surface of said layer, the conductors in at least one of said arrays being transparent; means to apply a first push-pull alternating signal between a first conductor in said first array and a first conductor in said second array; and means to apply a second push-pull alternating signal between a second conductor in said first array and a second conductor in said second array.

3. An electroluminescent device comprising an electroluminescent layer; a first array of parallel, separated, electrical conductors extending in a first direction in contact with one surface of said layer; a second array of parallel, separated, electrical conductors extending in a second and different direction in contact with the other surface of said layer, the conductors in at least one of said arrays being transparent; means to apply a first alternating signal between a first conductor in said first array and a first conductor in said second array; and means to apply a second alternating signal between a second conductor in said first array and a second conductor in said second array, the frequencies of said first and second signals differing by a small amount, said first conductor in said first array and said second conductor in said second array together with the portion of said layer interposed therebetween defining a first electroluminescent cell, said second conductor in said first array and said first conductor in said second array together with the portion of said layer interposed therebetween defining a second electroluminescent cell, said first and second cells emitting light pulsating at the difference frequency.

4. An electroluminescent device comprising an electroluminescent layer; a first array of parallel, separated, electrical conductors extending in a first direction in contact with one surface of said layer; a second array of parallel, separated, electrical conductors extending in a second and different direction in contact with the other surface of said layer, the conductors in at least one of said arrays being transparent; means to apply a first alternating signal between a first conductor in said first array and a first conductor in said second array; and means to apply a second alternating signal between a second conductor in said first array and a second conductor in said second array, said signals being shifted in phase with respect to each other, said first conductor in said first array and said second conductor in said second array together with the portion of said layer interposed therebetween defining a first electroluminescent cell, said second conductor in said first array and said first conductor in said second array together with the portion of said layer interposed therebetween defining a second electroluminescent cell, the intensity of light emitted from said first and second cells being dependent upon said phase shift, said intensity attaining a maximum value when said signals are in phase.

References Cited in the file of this patent

UNITED STATES PATENTS 2,774,813 Livingston -------------- Dec. 18, 1956